US006950925B1

(12) United States Patent  (10) Patent No.: US 6,950,925 B1
Sander et al.  (45) Date of Patent: Sep. 27, 2005

(54) SCHEDULER FOR USE IN A MICROPROCESSOR THAT SUPPORTS DATA-SPECULATIVE EXECUTION

(75) Inventors: Benjamin T. Sander, Austin, TX (US); Mitchell Alsup, Austin, TX (US); Michael Filippo, Manchaca, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 477 days.

(21) Appl. No.: 10/229,563

(22) Filed: Aug. 28, 2002

(51) Int. Cl.[7] ............................. G06F 9/30; G06F 9/38
(52) U.S. Cl. ..................... 712/215; 712/219; 712/245
(58) Field of Search ................................ 712/213, 215, 712/217, 239, 245; 711/125

(56) References Cited

U.S. PATENT DOCUMENTS

| 5,452,426 A | * | 9/1995 | Papworth et al. ............ 712/217 |
|---|---|---|---|
| 5,511,172 A | * | 4/1996 | Kimura et al. ............... 712/235 |
| 5,584,001 A | * | 12/1996 | Hoyt et al. ................... 712/238 |
| 5,966,544 A | | 10/1999 | Sager |
| 6,094,717 A | | 7/2000 | Merchant et al. |
| 6,185,668 B1 | | 2/2001 | Arya |
| 6,205,542 B1 | | 3/2001 | Grochowski et al. |
| 6,212,626 B1 | | 4/2001 | Merchant et al. |
| 6,564,315 B1 | | 5/2003 | Keller et al. |
| 2001/0010073 A1 | | 7/2001 | Janik et al. |

FOREIGN PATENT DOCUMENTS

WO  03/093983  11/2003

OTHER PUBLICATIONS

International search report application number PCT/US 03/22696 mailed Feb. 18, 2004.

Eric Rotenberg, "Trace Processors: Exploiting Hierarchy and Speculation," 1999, 69 pages.
Toshinori Sato, "Decoupling Recovery Mechanism for Data Speculation from Dynamic Instruction Sheduling Structure," 1999, 8 pages.
T. Sato, et al., "Comprehensive Evaluation of an Instruction Reissue Mechanism," IEEE, 2000 International Symposium on Parallel Architectures, Algorithms and Networks, Dec. 7, 2000, 9 pages.
Mikko H. Lipasti, et al., "Exceeding the Dataflow Limit via Value Prediction," Proceedings of the 29th Annual ACM/IEEE International Symposium on Microarchitecture, Dec. 2-4, 1996, 12 pages.
David M. Gallagher, et al., "Dynamic Memory Disambiguation Using the Memory Conflict Buffer," Appeared in ASPLOS-VI Proceedings, Oct. 1994, 13 pages.
Mikko H. Lipasti, et al., "Value Locality and Load Value Prediction," Reprint of paper to appear in ASPLOS-VII, Oct. 1996, 10 pages.

(Continued)

*Primary Examiner*—Daniel H. Pan
(74) *Attorney, Agent, or Firm*—Robert C. Kowert; Meyertons, Hood, Kivlin, Kowert & Goetzel, P.C.

(57) ABSTRACT

A microprocessor may include several execution units and a scheduler coupled to issue operations to at least one of the execution units. The scheduler may include several entries. A first entry may be allocated to a first operation. The first entry includes a source status indication for each of the first operation's operands. Each source status indication indicates whether a value of a respective one of the first operation's operands is speculative. The scheduler is configured to update one of the first entry's source status indications to indicate that a value of a respective one of the first operation's operands is non-speculative in response to receiving an indication that a value of a result of a second operation is non-speculative.

40 Claims, 5 Drawing Sheets

OTHER PUBLICATIONS

Brad Calder, et al., "A Comparative Survey of Load Speculation Architectures," Journal of Instruction-Level Parallelism I (2000), pp. 1-39.

Glenn Reinman, et al., "Predictive Techniques for Agressive Load Speculation," Published in the Proceedings of the Annual 31$^{st}$ International Symposium on Microarchitecture, Dec. 1998, 11 pages.

* cited by examiner

SCHEDULER FOR USE IN A MICROPROCESSOR THAT SUPPORTS DATA-SPECULATIVE EXECUTION

BACKGROUND OF THE INVENTION

1. Field of the Invention

This invention is related to the field of microprocessors, and more particularly, to scheduling operations for execution in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation is data speculation, which predicts data values. Some data speculation involves predicting the value that will be provided in response to a load instruction. This may be done by tracking the values that are stored in response to store instructions and, if a subsequent load uses the same register and/or displacement to specify an address as one of the previous stores used, speculatively using the value that was stored earlier. Another type of data speculation, value prediction, predicts the value of data items. Value prediction may involve observing patterns in data and basing the prediction on those patterns. For example, an index counter variable's value may be predicted by observing how prior values of that variable are incremented or decremented.

Another type of data speculation is address prediction, which involves predicting the location of data. Yet another type of data speculation is called memory system optimism. In multi-processor systems, memory system optimism occurs when a processor speculatively executes an instruction using data from that processor's local cache before coherency checking is complete. Similarly, another type of data speculation may allow a load to speculatively execute before a store that has an uncomputed address at the time the load executes, even though the store may store data to the same address that the load accesses. In all of these types of data speculation, the underlying conditions are eventually evaluated, allowing the speculation to be verified or undone. If the speculation ends up being incorrect, the instructions that executed using the speculative data may be re-executed (e.g., with updated and/or non-speculative data).

Since speculation allows execution to proceed without waiting for dependency checking to complete, significant performance gains may be achieved if the performance gained from correct speculations exceeds the performance lost to incorrect speculations. When a speculation turns out to be incorrect, the speculatively executed instructions are undone and execution is restarted non-speculatively. In order to undo speculative execution, each speculation may be recorded so that speculatively executed instructions can be identified in case the speculation turns out to be mispredicted.

One consequence of speculative execution is that schedulers (scheduling devices such as schedulers and reservation stations are collectively referred to as "schedulers" throughout) may not be able to deallocate speculative operations after execution, since these operations will need to be reissued if the underlying speculation is incorrect. A determination as to whether the underlying speculation is correct may not be made for several cycles, and it may not be possible to determine how many cycles it will take for that determination to be made. This uncertainty may make it difficult to ascertain when an operation can be deallocated from a scheduler. As a result, a scheduler entry may remain allocated to a speculative operation longer than is needed, leading to wasted space in the scheduler.

SUMMARY

Various embodiments of methods and systems for scheduling operations in a microprocessor are disclosed. In one embodiment, a microprocessor may include several execution units and a scheduler coupled to issue operations to at least one of the execution units. The scheduler may include an operation storage that has several entries and a scheduler control unit. A first entry in the operation storage may be allocated to a first operation. The first entry includes a source status indication for each of the first operation's operands. Each source status indication indicates whether a value of a respective one of the first operation's operands is speculative. The scheduler control unit is configured to update one of the first entry's source status indications to indicate that a value of a respective one of the first operation's operands is non-speculative in response to receiving an indication that a value of a result of a second operation is non-speculative.

One embodiment of a method may involve: a first source status indication indicating that a value of a first operand for a first operation is speculative, where the first operand is a result of a second operation; in response to receiving a first result status indication indicating that a value of the result of the second operation is not speculative, updating the first source status indication to indicate that the value of the first operand is not speculative; and in response to updating the first source status indication, a second result status indication indicating that a value of a result of the first operation is not speculative.

Another embodiment of a method may involve: a first source status indication corresponding to a first operand of a first branch operation indicating that a value of the first operand is speculative; receiving an indication that a value of a result of a second operation is non-speculative, where the result of the second operation is the first operand; in response to receiving the indication, updating the first source status indication to indicate that the value of the first operand is non-speculative; and delaying redirection of an instruction prefetch mechanism and flushing of a processing pipeline in response to a value of a result of the first branch operation until the first source status indication is updated to indicate that the first operand is non-speculative.

One embodiment of a computer system may include a system memory and a microprocessor coupled to the system memory. The microprocessor may include several execution units and a scheduler coupled to issue operations to at least one of the execution units. The scheduler may include several entries. A first entry is allocated to a first operation. The first entry may include a source status indication for each of the first operation's operands, and each source status indication may indicate whether a value of a respective one of the first operation's operands is speculative. The scheduler may be configured to update one of the first entry's source status indications to indicate that a value of a respective one of the first operation's operands is non-speculative in response to receiving an indication that a value of a result of a second operation is non-speculative.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Figure 1:
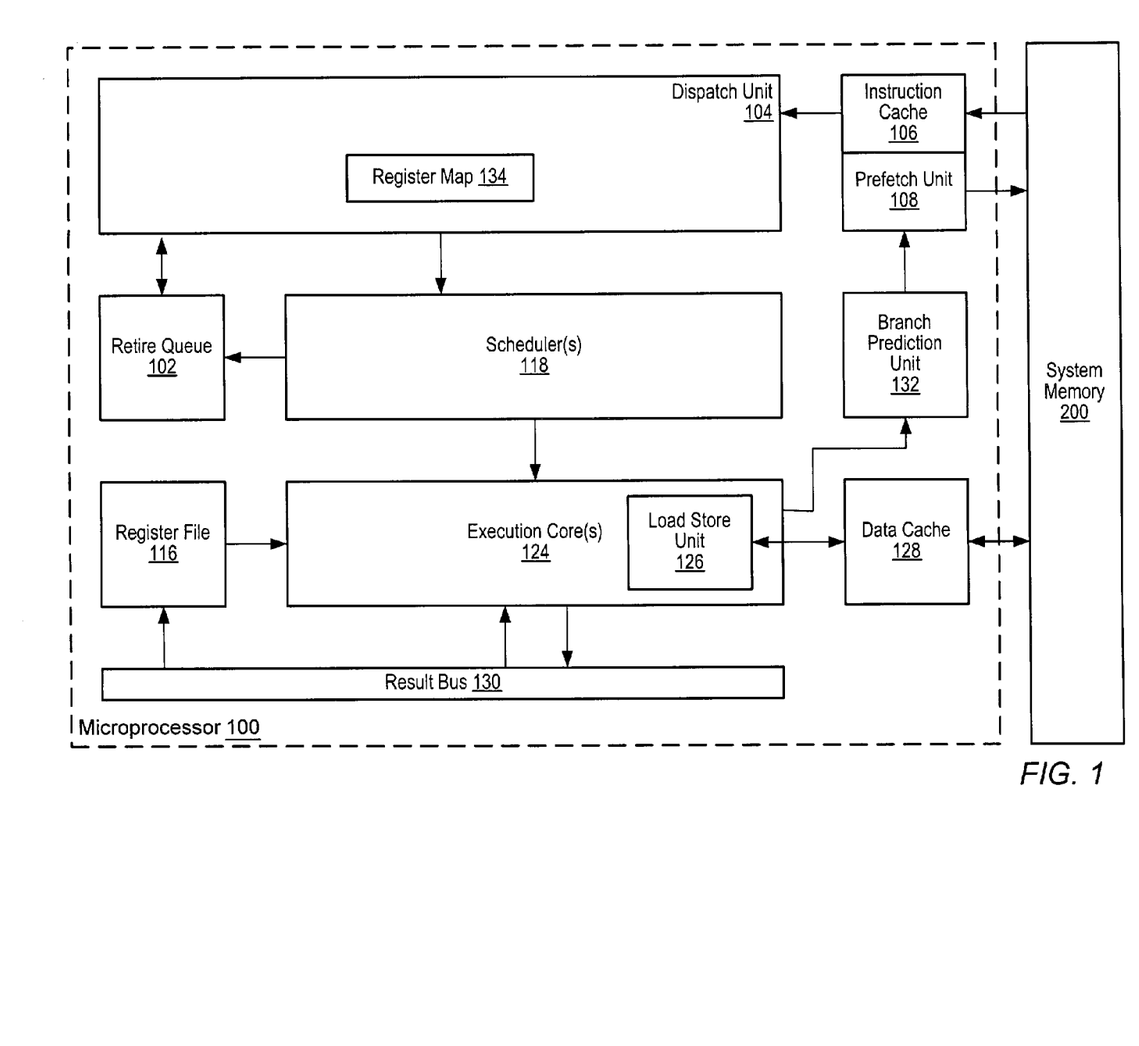
FIG. 1 shows one embodiment of a microprocessor.

FIG. 1—Microprocessor

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. Microprocessor 100 includes a mechanism to deallocate entries from scheduler(s) 118 in response to speculative operations and/or operands becoming non-speculative. Note that as used herein, a scheduler is a device that schedules operations for execution and issues operations to one or more execution cores or other means for executing operations. For example, a reservation station is an example of a scheduler.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired. In one embodiment, the microprocessor 100 may be designed to be compatible with the x86 architecture. Note that microprocessor 100 may also include many other components.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register). A register map 134 may translate logical register names of source and destination operands to physical register names in order to facilitate register renaming. Register map 134 may track which registers within register file 116 are currently allocated and unallocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. In some embodiments, retire queue 102 may also support register renaming by providing data value storage for speculative register states. In many embodiments, retire queue 102 may function similarly to a reorder buffer. However, unlike a typical reorder buffer, retire queue 102 may not provide any data value storage. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Upon decode of a particular operation, if a required operand is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation which, upon decode, is determined to modify the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a destination operand for an operation. Dispatch unit 104 may determine that register file 116 has one or more previously allocated physical registers assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 (or other means for scheduling operations for execution) may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in load/store unit 126 and/or register file 116.

If any of a branch instruction's operands are speculative (e.g., because data speculation has been performed on an operation that generates one of the branch instruction's operands, as described below), the result of the branch instruction will be speculative. In some embodiments, the speculative results of branch instructions may be used to determine whether the branch operation was mispredicted. If the speculative result indicates that a branch instruction was mispredicted, the branch prediction unit 132 may redirect the prefetch unit 108 and flush the instruction processing pipeline. However, in other embodiments, the branch prediction unit 132 may be configured to wait until the result of the branch operation becomes non-speculative before redirecting the prefetch unit 108 and flushing the processing pipeline. This may lead to fewer redirections and pipeline flushes if the speculative result of the branch operation turns out to be incorrect.

Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information for pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 128 and instruction cache 106 may be implemented in a unified cache in some embodiments.

Data values produced in the microprocessor 100 of FIG. 1 may include speculation status indications. Each speculation status indication may indicate whether an associated data value is speculative. For example, data values stored in the register file 116 may each have an associated speculation status indication, which may also be stored in the register file 116 and/or in register map 134. Similarly, data values generated by the execution core 124 may each have an associated speculation status indication, which may be output from the execution core 124 along with the associated data value and/or output onto a tag bus along with a tag identifying the data value. In one embodiment, a speculation status indication may be stored with each physical register identified in register map 134. Speculation status indications may be passed on a tag bus with the tags identifying the physical registers with which the speculation status indications are associated. Speculation status indications may alternatively be passed on a result bus along with the data values with which the speculation status indications are associated.

As described herein, a data value is speculative if there is a possibility that the data value may be recomputed. A data value may be recomputed if it is the result of an operation for which some data speculation has been performed (e.g., if a result of the operation is predicted in the dispatch unit 104) or if the data value depends on another data value that may be recomputed (e.g., if the data value is the result of an operation that executed using one or more speculative operands). A speculation status indication is one example of a means for indicating that an operand or an operation is speculative.

In one embodiment, a speculation status indication may be a single status bit that is set if the associated data value is speculative and cleared otherwise. The execution core 124 may be configured to set the speculation status indication for a data value if any of the operands used to generate the data value are speculative. Load/store unit 126 may be configured to set the speculation status indication associated with a data value to indicate whether the data value is speculative or not (e.g., if a load operation is allowed to pass a store operation with an uncomputed address, the resulting data value may be speculative). Similarly, when a storage location (e.g., in register file 116) is allocated to store the result of an operation, a speculation status indication in the storage location may be set if any of the operation's operands are speculative or if the operation itself is speculative. For example, if a storage location is allocated for the result of a load operation, the speculation status indication for the load operation's result may be set because the load may miss in the data cache 128 or pass a store operation with an uncomputed address. If a register map 134 is used to track speculative register states, physical registers in register file 116 that map to the same logical register may have different speculation status indications.

An operation may be speculative if data and/or value prediction is performed on the operation before it is dispatched to a scheduler 118. For example, some operations may tend to generate the same result. Those results may be stored in a lookup table. When one of those operations handled in dispatch unit 104, its result may be speculatively generated from the lookup table and stored in a register within register file 116 (or a storage location within a reorder buffer) allocated to store the operation's result. Since the result is speculative, the speculation status indication for the result may also be set to indicate that the result is speculative. When the operation is executed, its actual result may be compared to the speculative result to determine whether the speculation was correct. If the speculation is incorrect, the speculative result may be replaced with the actual result (e.g., by broadcasting the actual result on a result bus) and any operations that have already executed and whose results were computed from the speculative result may be reissued using the actual result. If the speculation is correct, an indication that the result is no longer speculative may be provided to the scheduler 118 and to the register file 116. Each scheduler 118 may maintain one or more speculation status indications for each operation in order to track which operations may reissue and to determine when operations may be removed from the scheduler, as described below. Each scheduler 118 may update a speculation status indication to indicate that an operation and/or an operand is no longer speculative in response to indications that speculation performed on an operation or an operand has resolved correctly.

Figure 2:
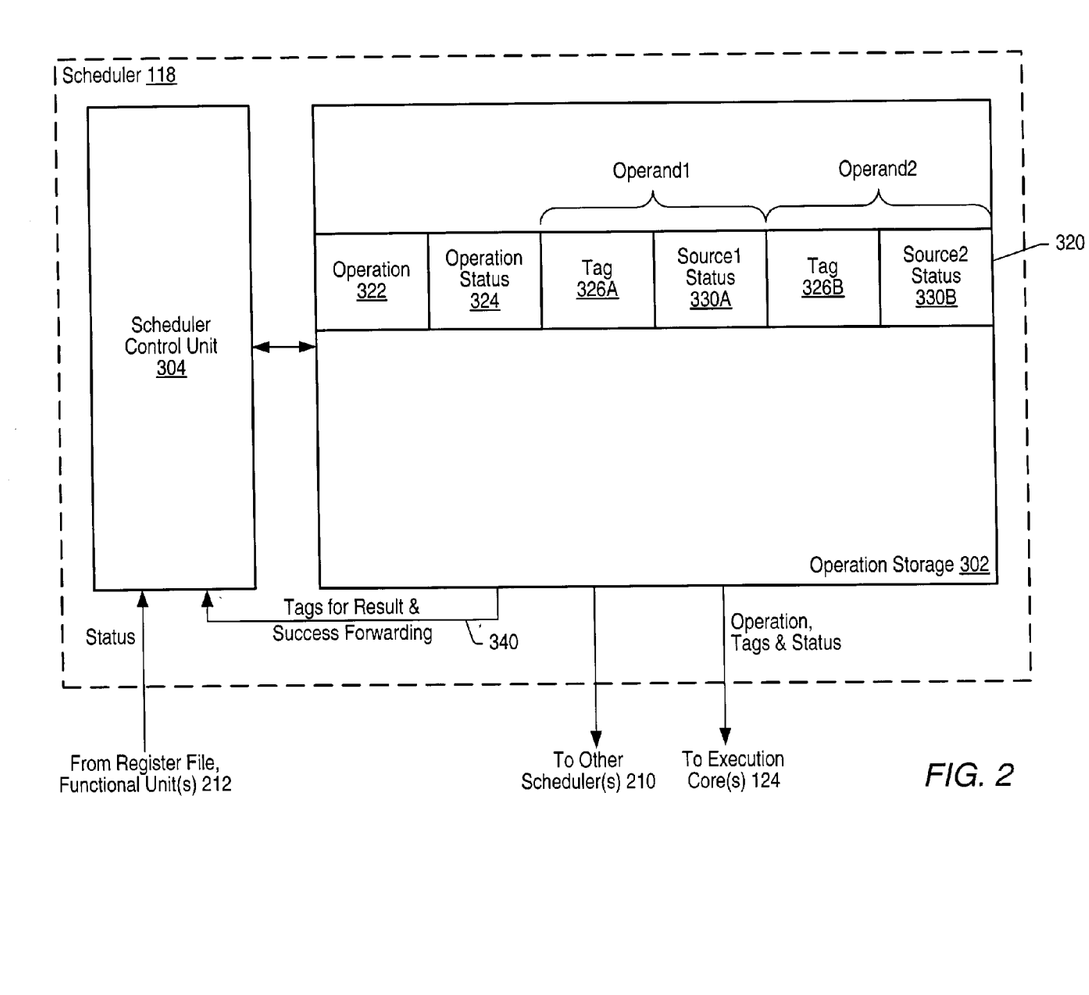
FIG. 2 is a block diagram of one embodiment of a scheduler.

FIG. 2—Scheduler

FIG. 2 shows one embodiment of a scheduler 118 that is configured to reissue operations. Scheduler 118 includes a scheduler control unit 304 and an operation storage 302. Scheduler control unit 304 may control operation storage 302 in order to allocate and deallocate entries for operations. The scheduler control unit 304 may allocate an entry 320 in operation storage 302 for an operation when that operation is dispatched to the scheduler by a dispatch unit 104. The entry 320 may remain allocated to the operation until any speculation performed on that operation or any of the operation's operands has resolved and the result of the speculation (e.g., the success or failure of the speculation) has been forwarded to any dependent operations (e.g., operations whose operand values are generated as the result of the operation).

In some embodiments, scheduler 118 may be one of several schedulers 118 in a processor 100. In such an embodiment, each scheduler 118 may be coupled to issue operations to a different execution core 124. Each of the schedulers 118 may be coupled to a set of one or more tag buses on which tags identifying the results of issued operations may be conveyed between schedulers (e.g., for result forwarding and/or for success forwarding, which will be discussed in more detail below).

Each entry in operation storage 302 may include several fields. The exemplary entry 320 shown in FIG. 2 includes an operation field 322 that stores the decoded operation, an operation speculation status field 324 that indicates whether the operation itself is speculative, and several groups of fields 326–330 for each of the operation's operands. In this example, there is a set of operand fields for each of two operands: Operand1 and Operand2. Operand1's fields are 326A and 330A and Operand2's fields are 326B and 330B. The fields for each operand include a tag field 326 that stores the operand's tag and a source speculation status field 330 that indicates whether the operand's value is (or will be) speculative. The source speculation status fields 330 each store a source speculation status indication such as a speculation status bit that is set if a corresponding operand value is speculative and cleared otherwise. Note that many embodiments may include a set of operand fields for each of several additional operands. For example, in one embodiment, each entry 320 may include storage for operand fields for five operands (e.g., three register sources and two flag sources). Each scheduler entry 320 may include a source speculation status indication for each operand.

In some embodiments, a scheduler entry 320 may include a value field that stores an operand's value for each operand if operand values are provided to execution core 124 from scheduler 118. In such embodiments, the operand values may be stored into an operation's entry 320 when the operation is dispatched if the operand values are already available (e.g., in register file 116 or a reorder buffer) or when the operand values become available (e.g., on result bus 130). Note that other embodiments may not include such value fields in each scheduler entry 320.

The tags identifying an operation's operands may be stored in the operation's entry 320 at dispatch time. If an operand value is not yet available, that operand's tag may be used to identify the operand value when it is generated as the result of a pending operation. For example, when the operation generating the operand value is issued to an execution core 124, the issuing scheduler 118 may output the operand's tag on tag bus 340. Scheduler control unit 304 may compare the tags on tag bus 340 to the operand tags in entries allocated within operation storage 302. If a tag on tag bus 340 matches an operand tag, scheduler control unit 304 may determine that the operand value identified by that tag will be available on the result bus 130 a certain number of cycles later.

The source speculation status indications 330 may be stored in an operation's entry 320 in operation storage 302 when that operation is dispatched to the scheduler 118. If a speculation status indication is set in a register or other storage location allocated to hold an operand value (or if a speculation indication associated with a particular register identified in a register map is set), the source speculation status indication for that operand is set in the operation's entry 320. Similarly, if any data or value speculation has been performed on the operation itself, the operation speculation status indication 324 may be set (e.g., the dispatch unit 104 may provide the operation speculation status indication to the scheduler 118 when an associated operation is dispatched).

When an operation is dispatched to scheduler 118, dispatch unit 104 may allocate a register or storage location to store the result of the operation. If any of the operation's source status indications 330 should be set, or if the operation status indication 324 should be set, the speculation status indication associated with the register or storage location allocated for the operation's result may also be set. The speculation status indications associated with various result storage locations may be stored in a reorder buffer, a register file, and/or a register map. The speculative status indications may be used to propagate the speculative status of each operand throughout the dependency chain.

Scheduler control unit 304 may select operations stored in entries in the operation storage 302 to issue to the execution core 124 for execution. The scheduler control unit 304 may select operations whose operand values are available (e.g., in register file 116) or whose operand values will be available on result bus 130 within a certain number of cycles, as indicated by tags on a tag bus 340. Operations may be selected based on the availability of their operand(s), if any, and their relative age (e.g., priority may be given to operations that have been waiting longer to be issued and/or to operations that occur earlier in program order). Each entry may have an associated readiness indication indicating whether that entry is ready to be issued. In many embodiments, operations that are not themselves speculative and that do not have any speculative operand values may be prioritized over speculative operations and operations with speculative operand values.

Scheduler control unit 304 may deallocate entries allocated to executed operations whose operation speculation status indication and source speculation status indications are clear. Entries allocated to speculative operations and/or operations whose operands have speculative values are not deallocated when the operations are executed, however. Keeping the entries allocated in the operation storage 302 allows the scheduler control unit 304 to reissue the operations if the speculation turns out to be incorrect. Since operations that depend on speculative operations are clearly identified within the scheduler by having set source speculation status indications 330, entries allocated to dependent operations may also be kept within the operation storage 302. This allows the operations in the dependency chain to be replayed in response to an incorrect speculation being detected.

Scheduler control unit 304 updates the operation speculation status indications 324 and source speculation status indications 330 in each entry 320 in operation storage 302 as speculations resolve (e.g., by clearing the appropriate source status indications 330 and/or operation status indications 324 each time a speculation resolves correctly). This way, an entry 320 may be deallocated when the source status indications 330 and operation status indication 324 indicate that the entry's operation will not reissue (e.g., when its source status indications and operation status indications are cleared). When the speculation for an operation resolves, the scheduler control unit 304 may clear the operation status indication for that operation. Scheduler control unit 304 is an example of a means for updating a speculation status indication.

The scheduler control unit 304 may reselect an issued operation if the operation speculation status indication 324 and the source speculation status indications 330 for that operation are cleared, since that indicates that any data and value speculation for that operation and its operands has resolved correctly. Once the speculation for the operation has resolved correctly, the operation's result is no longer speculative. The scheduler control unit 304 reselects the issued operation in order to forward the success of that operation's result to dependent operations, which may be stored in an operation storage 302 in the same scheduler 118 or in a different scheduler within the microprocessor. In response to receiving an indication that the speculative result of an operation is successful (i.e., not speculative), scheduler control unit 304 may update the source speculation status indications in operation storage 302 for the result operand generated by that operation to indicate that the result operand is no longer speculative.

The success of an operation's result may be forwarded using the tag buses used for result forwarding in some embodiments. For example, when the scheduler control unit 304 selects an issued operation whose speculation and/or whose operand value speculation has resolved, tags corresponding to that operation's result may be output on the tag bus 340 along with an indication that the tags are being output to clear the source speculation status indications 330 for operands generated by that operation. The same tag comparators (e.g., in scheduler control unit 304) that determine which operations' operand values are being generated during result forwarding may be used during success forwarding in some embodiments. The operation whose success if being forwarded may not be reexecuted as a result of success forwarding, and thus the latency of forwarding successful results may be less than the latency encountered with result forwarding (which depends on the operation's execution latency). Success forwarding may also clear the speculation status indication (e.g., stored in a register file, reorder buffer, or register map) associated with the storage location or register allocated to store the operation's result so that subsequently dispatched operations recognize that the operation's result is not speculative.

In alternative embodiments, a separate set of tag buses and tag comparators may be used for success forwarding (instead of using the same tag buses used for result forwarding). In embodiments where a separate set of tag buses and tag comparators are used for success forwarding, the scheduler 118 may be able to select an operation for execution during the same selection cycle in which another operation is selected for success forwarding.

In embodiments where the same tag bus 340 is used for result forwarding and for success forwarding, the scheduler control unit 304 may give priority to operations that have not been issued when selecting operations from operation storage 302. For example, scheduler control unit 304 may select already-issued operations for success forwarding when there are no unissued operations ready to be selected. When an operation is selected for success forwarding, its entry may be deallocated (i.e., the operation may be removed from the scheduler). In other embodiments, operations may be removed from the scheduler some time after their success is forwarded. In such embodiments, each entry may have an associated success-forwarded indication indicating whether an entry has already been selected to have its success forwarded so that the same operation is not selected for success forwarding more than once.

The scheduler control unit 304 may also be configured to detect the speculation status indications associated with data values output by the load/store unit 126 to satisfy a load operation. The scheduler control unit 304 may use these speculation status indications to update the source speculation status indications 330 for operations that depend on the load operation. If any speculation for the load operation resolved incorrectly, dependent operations may be reissued with the correct data value. Speculation status indications (e.g., stored in a reorder buffer, register file, or register map) associated with register and/or storage locations allocated to store the data value may also be updated in response to the speculation status indications associated with data output by the load/store unit 126.

When the speculation for a branch instruction that is speculative or that has speculative operand values resolves, success forwarding may involve the scheduler 118 providing the success indication to the branch prediction unit 132. In some embodiments, speculative results of branch instructions may be forwarded to the branch prediction unit. The branch prediction unit 132 may redirect the prefetch unit 108 and flush the processing pipeline based on speculative results of branch instructions in some embodiments. In other embodiments, the branch prediction unit 132 may delay redirecting the prefetch unit 108 and flushing the processing pipeline until branch instruction results become non-speculative. Thus, the branch prediction unit 132 may wait until the success of the speculation involving the branch instruction before redirecting the prefetch unit 108 and flushing the processing pipeline, if needed. The success of the speculation for the branch instruction may be forwarded when the scheduler control unit 304 selects the branch instruction for success forwarding in some embodiments. In other embodiments, the branch prediction unit 132 may be configured to use the result of the branch instruction as soon as the source speculation status indications and/or operation speculation status indications for the branch instruction are cleared, without waiting for the branch instruction to be selected by scheduler control unit 304 for success forwarding. Thus, in some embodiments, branch redirections may occur as soon as the branch operation has resolved successfully.

If the speculation for an operation and/or that operation's operand values resolves correctly before the operation is issued, the operation speculation status indication 324 and source speculation status indications 330 for that operation may be cleared when the operation is selected by scheduler control unit 304 and issued to a functional unit 212. Accordingly, the data generated by the functional unit 212 may have an associated indication (e.g., output on a tag bus or included with the data itself) that the result of the operation is not speculative. This indication may be received by scheduler control unit 304 and used to update the source speculation status indications in entries allocated to dependent operations. The indication associated with the data output by the functional unit 212 may also be used to update the speculation status indication (e.g., stored in a register file, reorder buffer, or register map) associated with the register or storage location allocated to store the result of the operation.

Note that in some embodiments, tracking speculative operations and operands and propagating the speculative status of data values to dependent operations may allow operations to be removed from a scheduler before they become the oldest unretired operations in the scheduler. This may allow entries in the scheduler 118 to be allocated to new operations sooner than they could otherwise be allocated.

Figure 3:
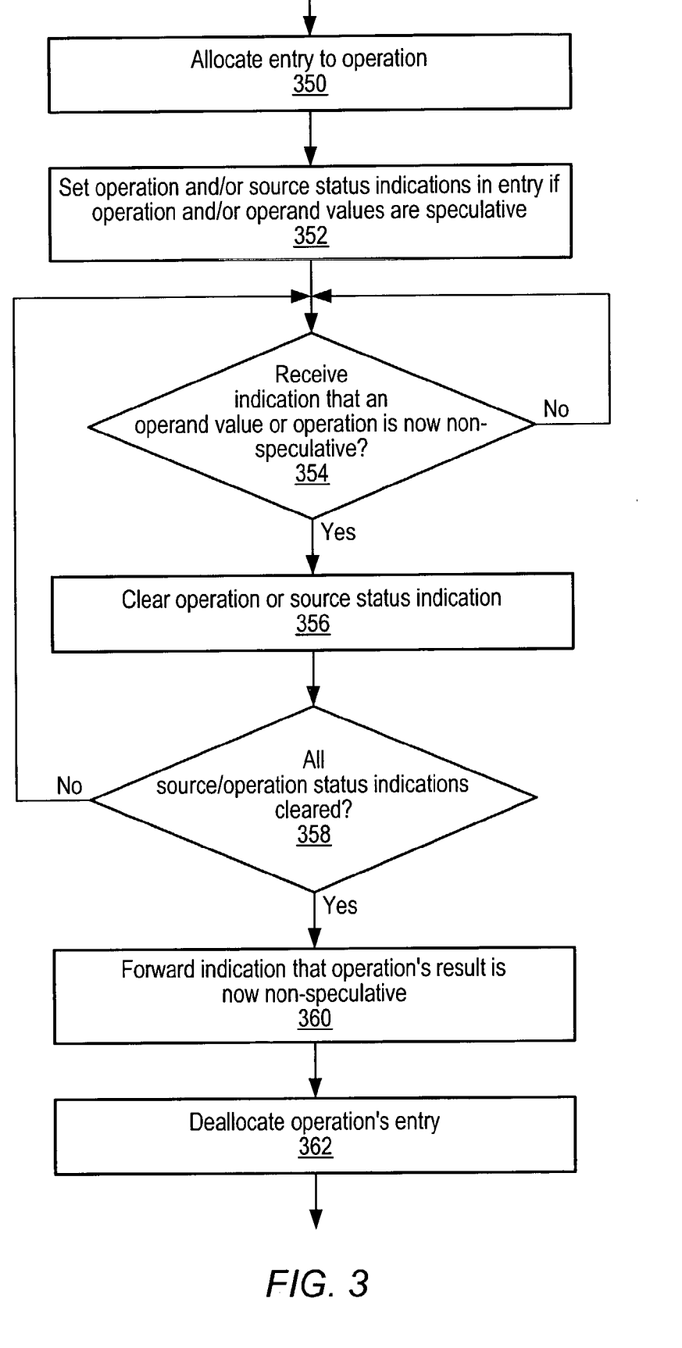
FIG. 3 is a flowchart showing one embodiment of a method of operating a microprocessor.

FIG. 3 shows one embodiment of a method of operating a microprocessor that supports data and value speculation. At 350, an entry in a scheduler is allocated to an operation. If the operation itself is speculative, the operation speculation status indication in the entry is set, as indicated at 352. Similarly, the source speculation status indications in the entry may be set for any operands that have speculative values, as indicated at 352. If an indication that the speculation for an operation or operand value has resolved correctly is received, the appropriate operation speculation status indication or source speculation status indication may be cleared, as shown at 354–356. The indication may be received as a result of the success of a prior operation being forwarded. If all of the source speculation status indications and the operation speculation status indication are cleared to indicate that all of the speculation has resolved correctly, an indication that the operation's result is not speculative may be forwarded, as indicated at 358–360. This indication may allow a scheduler to update source speculation status indications for dependent operations, propagating the success of the speculation through the dependency chain. The operation's entry in the scheduler may also be deallocated so that the entry can be reallocated to a new operation, as indicated at 362.

Figure 4:
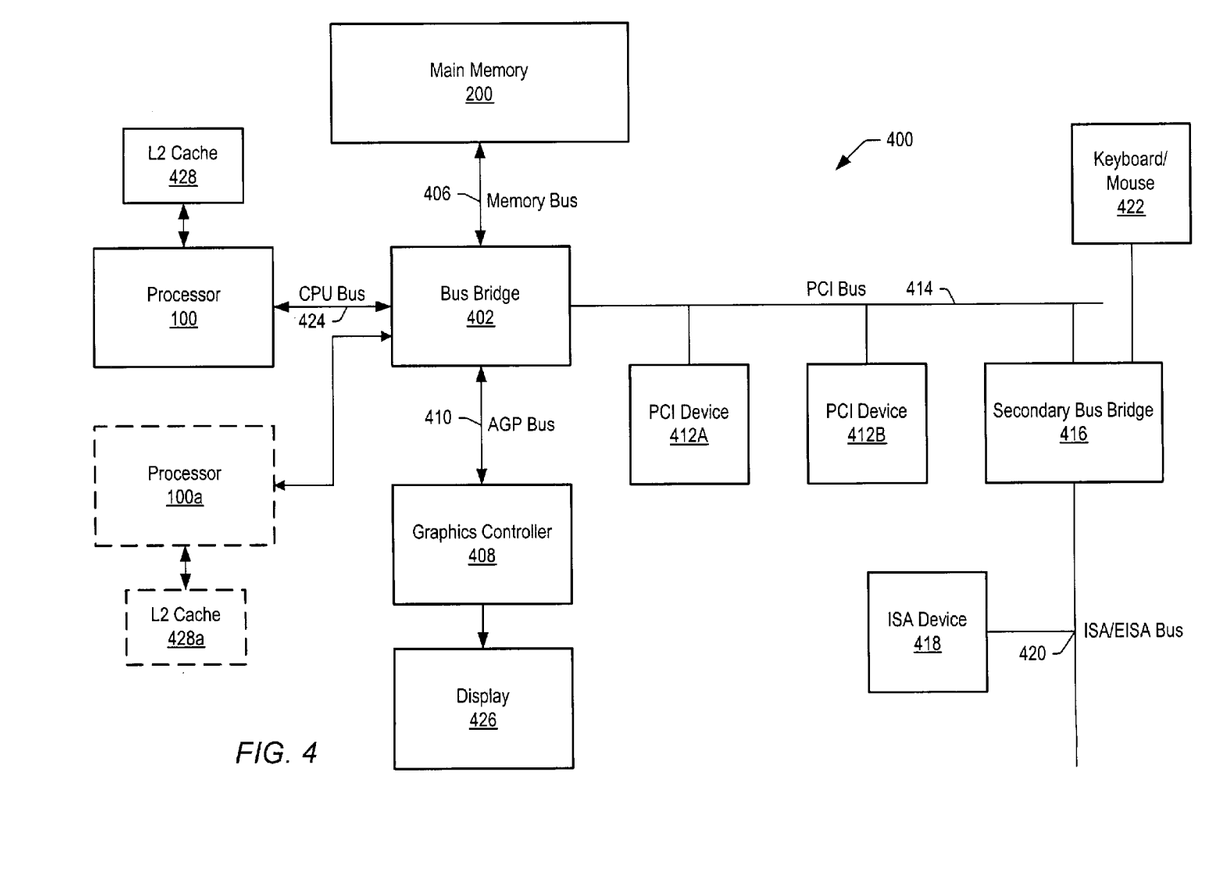
FIG. 4 shows an exemplary embodiment of a computer system.

FIG. 4—Computer System

FIG. 4 shows a block diagram of one embodiment of a computer system 400 that includes a processor 100 coupled to a variety of system components through a bus bridge 402. Processor 100 may include an embodiment of a scheduler 118 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 10 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 200, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

Figure 5:
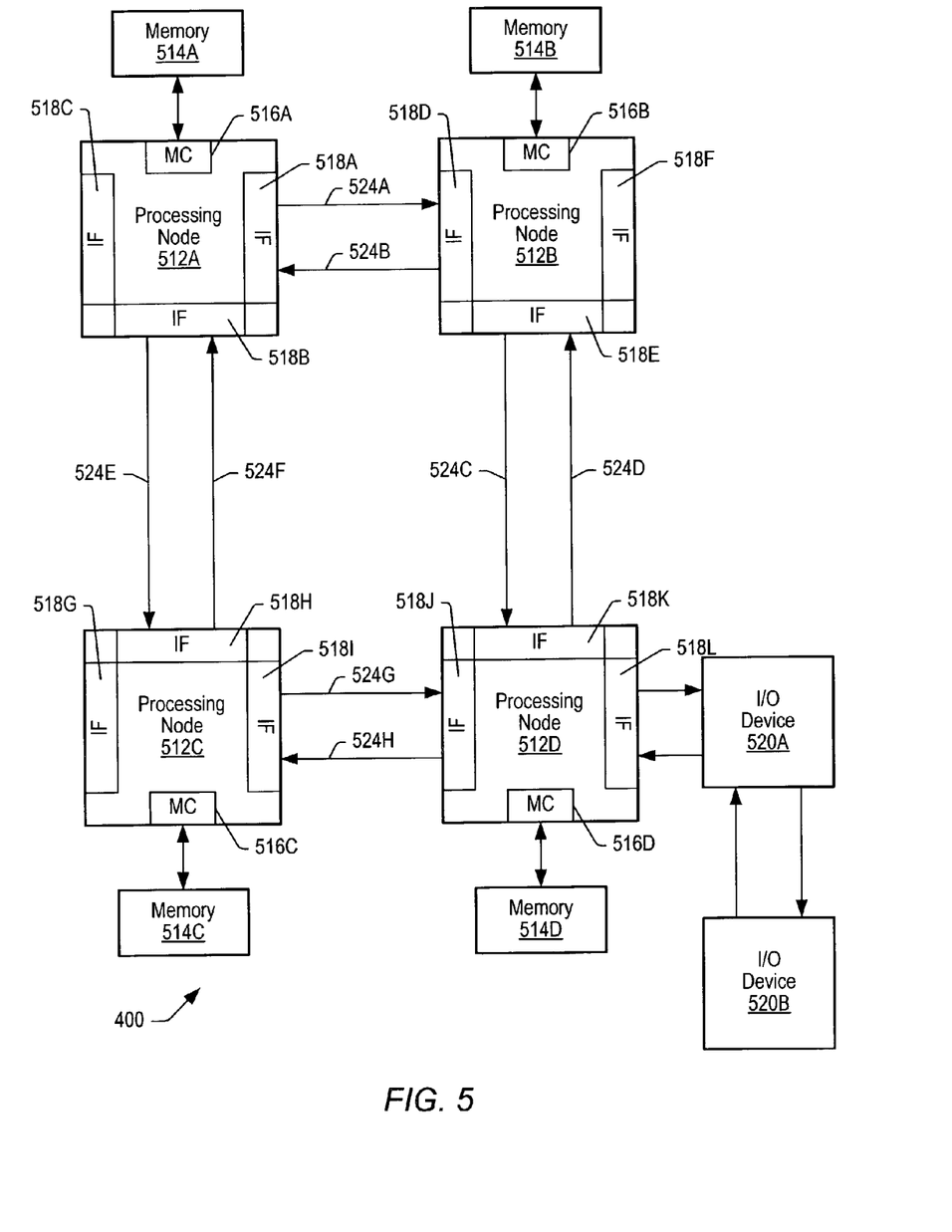
FIG. 5 shows another embodiment of a computer system.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100a shown as an optional component of computer system 400). Processor 10a may be similar to processor 100. More particularly, processor 100a may be an identical copy of processor 100. Processor 100a may be connected to bus bridge 402 via an independent bus (as shown in FIG. 5) or may share CPU bus 224 with processor 100. Furthermore, processor 100a may be coupled to an optional L2 cache 428a similar to L2 cache 428.

FIG. 5—Multi-node Processing System

Turning now to FIG. 5, another embodiment of a computer system 400 that may include a processor 100 having a reissuable scheduler as described above is shown. Other embodiments are possible and contemplated. In the embodiment of FIG. 5, computer system 400 includes several processing nodes 512A, 512B, 512C, and 512D. Each processing node is coupled to a respective memory 514A–514D via a memory controller 516A–516D included within each respective processing node 512A–512D. Additionally, processing nodes 512A–512D include interface logic used to communicate between the processing nodes 512A–512D. For example, processing node 512A includes interface logic 518A for communicating with processing node 512B, interface logic 518B for communicating with processing node 512C, and a third interface logic 518C for communicating with yet another processing node (not shown). Similarly, processing node 512B includes interface logic 518D, 518E, and 518F; processing node 512C includes interface logic 518G, 518H, and 518I; and processing node 512D includes interface logic 518J, 518K, and 518L. Processing node 512D is coupled to communicate with a plurality of input/output devices (e.g., devices 520A–520B in a daisy chain configuration) via interface logic 518L. Other processing nodes may communicate with other I/O devices in a similar fashion.

Processing nodes 512A–512D implement a packet-based link for inter-processing node communication. In the present embodiment, the link is implemented as sets of unidirectional lines (e.g., lines 524A are used to transmit packets from processing node 512A to processing node 512B and lines 524B are used to transmit packets from processing node 512B to processing node 512A). Other sets of lines 524C–524H are used to transmit packets between other processing nodes as illustrated in FIG. 5. Generally, each set of lines 524 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 512A to processing node 512D may pass through either processing node 512B or processing node 512C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 524 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 512A–512D, in addition to a memory controller and interface logic, may include one or more processors. Broadly speaking, a processing node comprises at least one processor and may optionally include a memory controller for communicating with a memory and other logic as desired. More particularly, each processing node 512A–512D may include one or more copies of processor 100. External interface unit 18 may includes the interface logic 518 within the node, as well as the memory controller 516.

Memories 514A–514D may comprise any suitable memory devices. For example, a memory 514A–514D may comprise one or more RAMBUS DRAMs (RDRAMs), synchronous DRAMs (SDRAMs), static RAM, etc. The address space of computer system 400 is divided among memories 514A–514D. Each processing node 512A–512D may include a memory map used to determine which addresses are mapped to which memories 514A–514D, and hence to which processing node 512A–512D a memory request for a particular address should be routed. In one embodiment, the coherency point for an address within computer system 400 is the memory controller 516A–516D coupled to the memory storing bytes corresponding to the address. In other words, the memory controller 516A–516D is responsible for ensuring that each memory access to the corresponding memory 514A–514D occurs in a cache coherent fashion. Memory controllers 516A–516D may comprise control circuitry for interfacing to memories 514A–514D. Additionally, memory controllers 516A–516D may include request queues for queuing memory requests.

Interface logic 518A–518L may comprise a variety of buffers for receiving packets from the link and for buffering packets to be transmitted upon the link. Computer system 400 may employ any suitable flow control mechanism for transmitting packets. For example, in one embodiment, each interface logic 518 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 520A–520B may be any suitable I/O devices. For example, I/O devices 520A–520B may include devices for communicate with another computer system to which the devices may be coupled (e.g., network interface cards or modems). Furthermore, I/O devices 520A–520B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a plurality of execution units; and
   a scheduler coupled to issue operations to at least one of the plurality of execution units, wherein the scheduler includes:
      an operation storage including a plurality of entries, wherein a first entry is allocated to a first operation, wherein the first operation operates on one or more operands, wherein the first entry includes one or more source status indications, wherein each source status indication indicates whether a value of a respective one of the one or more operands is speculative; and
      a scheduler control unit coupled to the operation storage and configured to update one of the one or more source status indications included in the first entry to indicate that a value of a respective one of the one or more operands is non-speculative in response to receiving an indication that a value of a result of a second operation is non-speculative.

2. The microprocessor of claim 1, wherein a first execution unit of the plurality of execution units is configured to execute the first operation to generate a result of the first operation, wherein the result of the first operation includes a result indication, wherein the result indication indicates that a value of the result of the first operation is speculative if any of the one or more source status indications included in the first entry indicates that a respective one of the one or more operands is speculative.

3. The microprocessor of claim 2, wherein the first entry includes an operation status indication indicating whether the first operation is speculative, wherein the result indication indicates that the value of the result of the first operation is speculative if the operation status indication indicates that the first operation is speculative.

4. The microprocessor of claim 1, further comprising a dispatch unit configured to dispatch the first operation to the scheduler, wherein the dispatch unit is configured to provide the one or more source status indications corresponding to each of the one or more operands to the scheduler.

5. The microprocessor of claim 4, further comprising a reorder buffer, wherein the reorder buffer includes a storage location allocated to store an operand value of one of the one or more operands, wherein the storage location includes an indication of whether the operand value of the one of the one or more operands is speculative, wherein the dispatch unit is configured to provide the indication as the source status indication for the one of the one or more operands.

6. The microprocessor of claim 4, further comprising a register file, wherein the register file includes a register allocated to store an operand value of one of the one or more operands, wherein the register includes an indication of whether the operand value of the one of the one or more operands is speculative, wherein the dispatch unit is configured to provide the indication as the source status indication for the one of the one or more operands.

7. The microprocessor of claim 4, further comprising a register map, wherein the register map includes a tag identifying a physical register allocated to store an operand value of one of the one or more operands, wherein the register map further includes an indication associated with the tag, wherein the indication indicates whether the operand value is speculative.

8. The microprocessor of claim 4, wherein the dispatch unit is configured to provide an operation status indication corresponding to the first operation to the scheduler, wherein the operation status indication indicates whether any speculation was performed on the first operation, wherein the scheduler control unit is configured to store the operation status indication in the first entry.

9. The microprocessor of claim 8, wherein the scheduler control unit is configured to update the operation status indication to indicate that the first operation is not speculative in response to receiving an indication that speculation performed on the first operation resolved correctly.

10. The microprocessor of claim 4, wherein the first operation indicates that a result of the first operation will be stored in a first register, wherein in response to one of the source status indications included in the first entry indicating that a value of a respective one of the one or more operands is speculative, the dispatch unit is configured to store a result indication indicating that the result of the first operation is speculative in a storage location allocated to the result of the first operation.

11. The microprocessor of claim 10, wherein the storage location is included in a register file.

12. The microprocessor of claim 11, wherein the reorder buffer is configured to update the result indication in the storage location in response to receiving an indication that the result of the first operation is not speculative.

13. The microprocessor of claim 1, wherein a tag corresponding to the result of the second operation equals a tag corresponding to one of the one or more operands, wherein the scheduler control unit is configured to update one of the one or more source status indications included in the first entry in response to receiving the tag corresponding to the result of the second operation on a tag bus.

14. The microprocessor of claim 13, wherein the scheduler control unit is configured to update the one of the one or more source status indications in response to receiving an indication that the tag corresponding to the first operand is provided on the tag bus in order to update speculative status indications, wherein the tag bus is also used for result forwarding.

15. The microprocessor of claim 1, wherein the scheduler control unit is coupled to a first tag bus and a second tag bus; wherein the scheduler control unit is configured to output a tag identifying a result of the first operation on the first tag bus if the first operation is selected for execution; and wherein the scheduler control unit is configured to output a tag identifying the result of the first operation on the second tag bus if the first operation is selected to forward an indication that any speculation performed on the first operation and the one or more operands of the first operation is successful.

16. The microprocessor of claim 1, wherein the scheduler control unit is configured to deallocate the first entry in response to reissuing the first operation if each of the one or more source status indications included in the first entry indicates that a value of a respective one of the one or more operands is non-speculative.

17. The microprocessor of claim 16, wherein the scheduler control unit is configured to deallocate the first entry before the first operation becomes the oldest unretired operation stored in the operation storage.

18. The microprocessor of claim 1, further comprising a branch prediction unit coupled to the scheduler and a prefetch unit coupled to the branch prediction unit, wherein if the first operation is a branch operation, the branch prediction unit is configured to delay both redirecting the prefetch unit and flushing a processing pipeline in response to a result of the first operation until each of the one or more source status indications in the first entry indicates that a value of a respective one of the one or more operands is non-speculative.

19. The microprocessor of claim 1, further comprising a load/store unit, wherein the load store unit is configured to output a load result of a load operation, wherein the load result includes a data value and a result status indication indicating whether the data value is speculative.

20. The microprocessor of claim 19, wherein the result status indication indicates that the data value is speculative if the load operation passed a store operation with an uncomputed address.

21. The microprocessor of claim 1, wherein the scheduler control unit is configured to select an operation stored in one of the plurality of entries in the operation storage and to provide the selected operation to a functional unit for execution, wherein the scheduler control unit is configured to prioritize selection of operations with non-speculative operands as indicated by source status indications included in each entry in the operation storage.

22. A method comprising:
a first source status indication indicating that a value of a first operand for a first operation is speculative, wherein the first operand is a result of a second operation;
in response to receiving a second result status indication indicating that a value of the result of the second operation is not speculative, updating the first source status indication to indicate that the value of the first operand is not speculative; and
in response to said updating, a first result status indication indicating that a value of a result of the first operation is not speculative.

23. The method of claim 22, further comprising:
an operation status indication indicating that a third operation is speculative; and
executing the third operation to generate a result of the third operation, wherein the result of the third operation has an associated third result status indication, wherein the third result status indication indicates that the value of the result of the third operation is speculative in response to the operation status indication indicating that the third operation is speculative.

24. The method of claim 22, further comprising dispatching the first operation to a scheduler, wherein said dispatching includes allocating a first entry in the scheduler to the first operation, wherein the first entry includes the first source status indication.

25. The method of claim 24, wherein said dispatching includes providing the first source status indication to the scheduler.

26. The method of claim 25, wherein said providing includes providing the first source status indication from a storage location allocated to store the value of the first operand, wherein the storage location is included in a reorder buffer.

27. The method of claim 25, wherein said providing includes providing the first source status indication from a register map, wherein the first indication is associated with a tag stored in the register map, wherein the tag identifies a register allocated to store the value of the first operand.

28. The method of claim 25, wherein said providing includes providing the first source status indication from a storage location allocated to store the value of the first operand, wherein the storage location is included in a register file.

29. The method of claim 25, wherein said providing includes providing the first source status indication from a register allocated to store the value of the first operand.

30. The method of claim 24, wherein said dispatching includes providing an operation status indication to the scheduler, wherein the operation status indication indicates whether the first operation is speculative.

31. The method of claim 30, further comprising updating the operation status indication to indicate that the first operation is not speculative in response to receiving an indication that speculation performed on the first operation resolved correctly.

32. The method of claim 24, wherein said dispatching includes storing a result indication indicating that the result of the first operation is speculative in a storage location allocated to the result of the first operation in response to the first source status indication indicating that the value of the first operand is speculative.

33. The method of claim 32, further comprising updating the result indication in the storage location to indicate that the result of the first operation is not speculative in response to the first result status indication indicating that the value of the result of the first operation is not speculative.

34. The method of claim 24, further comprising deallocating the first entry in response to the first result status indication indicating that the value of the result of the first operation is not speculative.

35. The method of claim 34, wherein said deallocating occurs before the first operation becomes the oldest unretired operation stored in the scheduler.

36. A method comprising:
a first source status indication corresponding to a first operand of a first branch instruction indicating that a value of the first operand is speculative;
receiving an indication that a value of a result of a second operation is non-speculative, wherein the result of the second operation is the first operand;
in response to said receiving, updating the first source status indication to indicate that the value of the first operand is non-speculative; and
delaying redirection of an instruction prefetch mechanism and flushing of a processing pipeline in response to a value of a result of the first branch instruction until said updating.

37. The method of claim 36, wherein said redirecting occurs before an indication that the value of the result of the first branch operation is non-speculative is provided to a scheduler.

38. The method of claim 36, wherein said delaying further comprises delaying redirection of the instruction prefetch mechanism and flushing of the processing pipeline until a first operation status indication associated with the first branch instruction is updated to indicate that any speculation performed on the first branch instruction has resolved successfully.

39. A microprocessor comprising:
means for executing operations; and
means for scheduling operations to be executed by the means for executing operations, wherein the means for scheduling include a speculation status indication indicating that a value of a first operand is speculative, wherein the first operand is operated on by a first operation;
wherein the means for scheduling update the speculation status indication in response to receiving an indication that the value of the first operand is non-speculative; and
wherein the means for scheduling generate the indication in response to detecting that a value of a result of a second operation is non-speculative.

40. A computer system comprising:
a system memory;
a microprocessor coupled to the system memory, the microprocessor comprising:
a plurality of execution units; and
a scheduler coupled to issue operations to at least one of the plurality of execution units, wherein the scheduler includes a plurality of entries, wherein a first entry is allocated to a first operation, wherein the first operation operates on one or more operands, wherein the first entry includes a source status indication for each of the one or more operands, wherein each source status indication indicates whether a value of a respective one of the one or more operands is speculative; and
wherein the scheduler is configured to update one of the source status indications included in the first entry to indicate that a value of a respective one of the one or more operands is non-speculative in response to receiving an indication that a value of a result of a second operation is non-speculative.

* * * * *